(12) United States Patent
Toida et al.

(10) Patent No.: US 7,542,145 B2
(45) Date of Patent: Jun. 2, 2009

(54) OPTICAL TOMOGRAPHY METHOD AND OPTICAL TOMOGRAPHY SYSTEM

(75) Inventors: Masahiro Toida, Kanagawa-ken (JP); Karin Kawahara, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 120 days.

(21) Appl. No.: 11/540,712

(22) Filed: Oct. 2, 2006

(65) Prior Publication Data

US 2007/0076211 A1 Apr. 5, 2007

(30) Foreign Application Priority Data

Sep. 30, 2005 (JP) ............................ 2005-288657

(51) Int. Cl.
*G01B 9/02* (2006.01)
(52) U.S. Cl. ..................................... 356/479
(58) Field of Classification Search ................ 356/456, 356/479, 497, 506, 451
See application file for complete search history.

(56) References Cited

U.S. PATENT DOCUMENTS

| | | | | |
|---|---|---|---|---|
| 5,075,619 A * | 12/1991 | Said | ........................ | 324/76.31 |
| 5,530,544 A * | 6/1996 | Trebino et al. | ............... | 356/450 |
| 5,778,038 A * | 7/1998 | Brandt et al. | ................... | 378/4 |
| 6,151,378 A * | 11/2000 | Rasche et al. | ................... | 378/4 |
| 6,707,576 B1 * | 3/2004 | Chang | ........................ | 358/1.9 |
| 6,980,299 B1 * | 12/2005 | de Boer | ........................ | 356/497 |
| 7,148,970 B2 * | 12/2006 | de Boer | ........................ | 356/497 |
| 2005/0280828 A1 * | 12/2005 | de Boer | ........................ | 356/497 |
| 2006/0179089 A1 * | 8/2006 | Moriya | ........................ | 708/200 |
| 2006/0215170 A1 | 9/2006 | Toida et al. | | |
| 2007/0177784 A1 * | 8/2007 | Valdiserri et al. | ........... | 382/128 |
| 2007/0276269 A1 * | 11/2007 | Yun et al. | ................... | 600/504 |

FOREIGN PATENT DOCUMENTS

| | | |
|---|---|---|
| EP | 1 705 476 | 9/2006 |
| JP | 6-165784 A | 6/1994 |
| JP | 2003-3139688 A | 5/2003 |

OTHER PUBLICATIONS

European Search Report.
Tripathi R. et al. "Spectral Shaping for Non-Gaussian Source Spectra In Optical Coherence Tomography," Mar. 15, 2002, Optics Letters, OSA, Optical Society of America, Washington DC, pp. 406-408.

(Continued)

*Primary Examiner*—Patrick J Connolly
*Assistant Examiner*—Scott M Richey
(74) *Attorney, Agent, or Firm*—Sughrue Mion, PLLC

(57) ABSTRACT

Light emitted from a light source is divided into measuring light and reference light. The reflected light from the object and the reference light are superposed. Interference light of the reflected light and reference light which have been superposed is detected. Intensities of the reflected light in a plurality of positions in the direction of depth of the object are detected on the basis of the frequency and the intensity, and a tomographic image of the object is obtained on the basis of the intensity of the reflected light in each position in the direction of depth. A compensating signal is obtained by removing the spectral components of the measuring light from an interference signal obtained by detection of the interference light, and the compensating signal is provided for detection of the intensities of the reflected light after a Gaussian transform.

18 Claims, 11 Drawing Sheets

OTHER PUBLICATIONS

Saxer C. et al. "High-Speed Fiber-Based Polarization-Sensitive Optical Coherence Tomography of In Vivo Human Skin," Sep. 15, 2000, Optics Letters, OSA, Optical Society of America, Washington DC, pp. 1355-1357.

Marks D. L. et al. "A Method for Dynamically Suppressing Sidelobes in Optical Coherence Tomography," Apr. 15, 2004, Biomedical Imaging: Macro To Nano, 2004, IEEE International Symposium on Arlington VA, USA Apr. 15-18, 2004, Piscataway, NJ USA, IEEE, pp. 676-679.

Smith E. D. J. et al. "Spectral Domain Interferometry for OCDR Using Non-Gaussian Broad-Band Sources," IEEE Photonics Technology Letters, IEEE Service Center, Piscataway, NJ, US, vol. 13, No. 1, Jan. 2001.

M. Takeda, "Optical Frequency Scanning Interference Microscopes", Optics Engineering Contact, vol. 41, No. 7, pp. 426-432, 2003, together with an English translation of a relevant portion, p. 426, right col., line 8-p. 427, right col., line 7.

\* cited by examiner

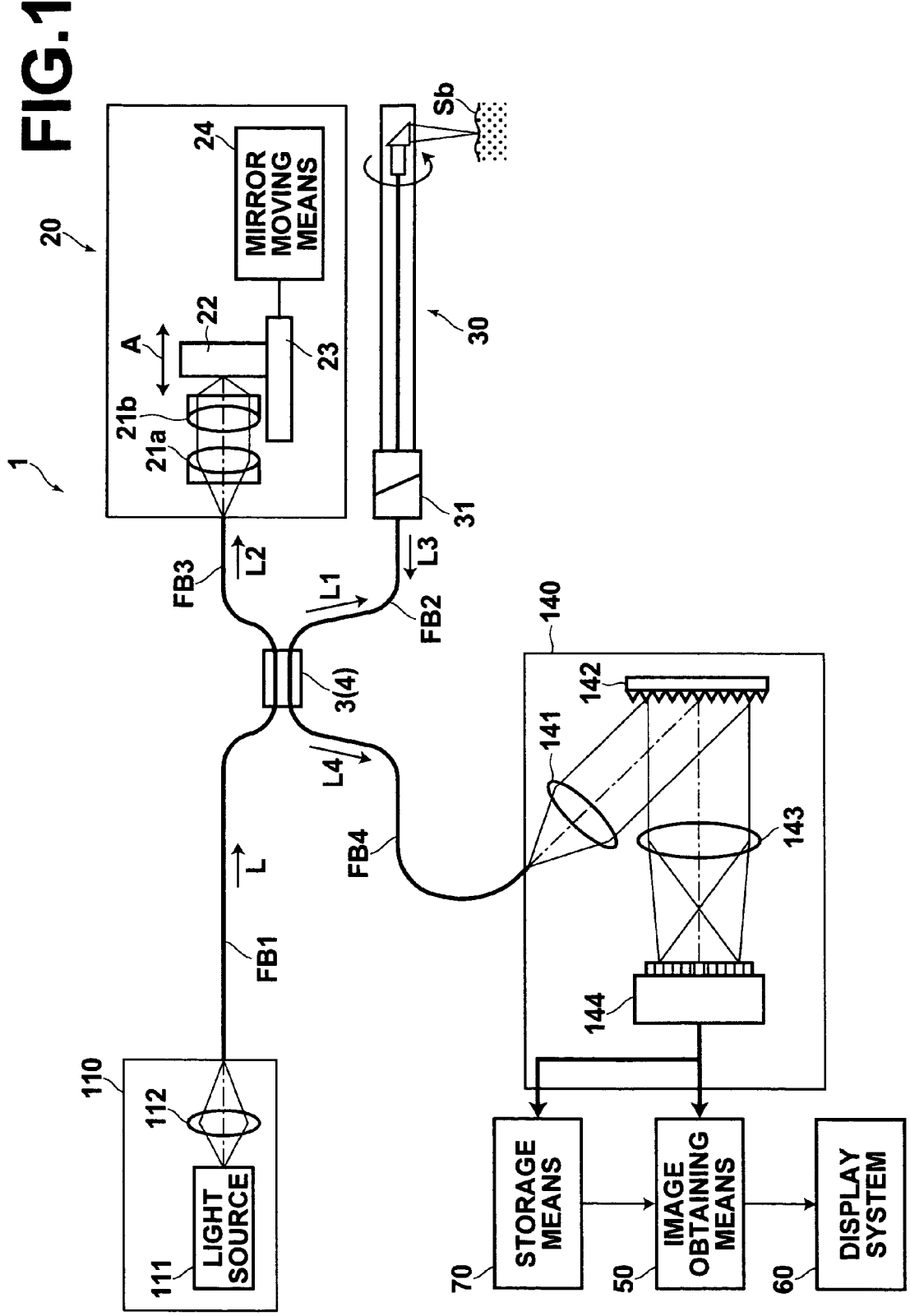

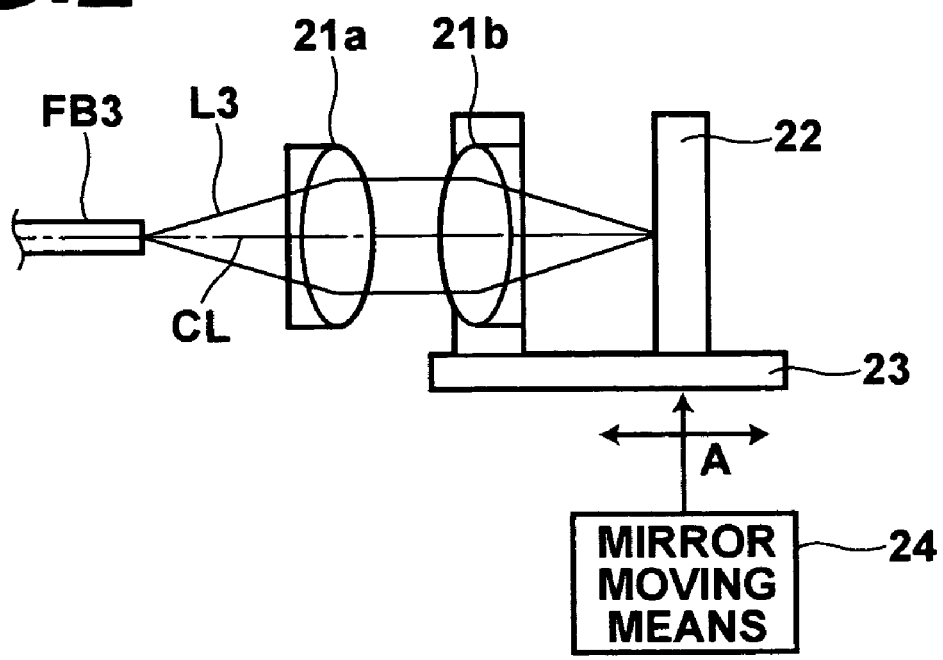

OPTICAL TOMOGRAPHY METHOD AND OPTICAL TOMOGRAPHY SYSTEM

BACKGROUND OF THE INVENTION

1. Field of the Invention

This invention relates to an optical tomography method of and an optical tomography system for obtaining an optical tomographic image by measurement of OCT (optical coherence tomography).

2. Description of the Related Art

As a method of obtaining a tomographic image of an object of measurement such as living tissue, it is proposed to measure OCT (optical coherence tomography) as disclosed in Japanese Unexamined Patent Publication Nos. 6(1994)-165784 and 2003-139688. In the OCT measurement, a phenomenon that interference light is detected when the optical paths of the measuring light and the reflected light conform to the optical path of the reference light in length is used. That is, in this method, low coherent light emitted from a light source is divided into measuring light and reference light and the measuring light is projected onto the object of measurement, while the reflected light from the object of measurement is led to a multiplexing means. The reference light is led to the multiplexing means after its optical path length is changed in order to change the depth of measurement in the object. By the multiplexing means, the reflected light and the reference light are superposed one on another, and interference light due to the superposition is detected by, for instance, heterodyne detection.

In the above OCT system, a tomographic image is obtained by changing the optical path length of the reference light, thereby changing the measuring position (the depth of measurement) in the object. This technique is generally referred to as "TD-OCT (time domain OCT)". More specifically, in the optical path length changing mechanism for the reference light disclosed in Japanese Unexamined Patent Publication No. 6(1994)-165784, an optical system which collects the reference light emitted from the optical fiber on a mirror is provided and the optical path length is adjusted by moving only the mirror in the direction of the beam axis of the reference light. Further, in the optical path length changing mechanism for the reference light disclosed in Japanese Unexamined Patent Publication No. 2003-139688, the reference light emitted from the optical fiber is turned to parallel light, the reference light in the parallel light is collected and caused to enter the optical fiber again by an optical path length adjusting lens, and the optical path length adjusting lens is moved back and forth in the direction of the beam axis of the reference light.

Whereas, as a system for rapidly obtaining a tomographic image without changing the optical path length of the reference light, there has been proposed an optical tomography system for obtaining an optical tomographic image by measurement of SD-OCT (spectral domain OCT). In the SD-OCT system, a tomographic image is formed without scanning in the direction of depth, by dividing broad band, low coherent light into measuring light and reference light by the use of a Michelson interferometer, projecting the measuring light onto the object and carrying out a Fourier analysis on each channeled spectrum obtained by decomposing the interference light of the reflected light, which returns at that time, and the reference light.

As another system for rapidly obtaining a tomographic image without changing the optical path length of the reference light, there has been proposed an optical tomography system for obtaining an optical tomographic image by measurement of SS-OCT (swept source OCT). In the SS-OCT system, the frequency of the laser beam emitted from the light source is swept to cause the reflected light and the reference light to interfere with each other, the intensity of the reflected light at the depth of the object is detected from the interferogram, and a tomographic image is formed by the use of the intensity of the reflected light at the depth of the object.

In the SD-OCT system and the SS-OCT system described above, since information on the direction of depth of the object is detected on the basis of interference of light, a stability of the intensity and the spectrum of the measuring light is required in both the instantaneous aspect and the aspect with time. More specifically, an ideal spectral characteristic where the relation between the wavelength and the intensity is represented by a Gaussian distribution is required. However, depending upon the characteristics of the light source, the relation cannot be originally satisfied or the relation comes to be unable to be satisfied with change with time. Fluctuation in the intensity of the measuring light leads to errors in measurement of information on the reflection from the object, and fluctuation of the spectral shape generates a pseudo signal in the interference signal due to generation of a side lobe.

OCT systems have been developed and are in use in the field of ophthalmology. Following the use of OCT systems in the field of ophthalmology, research and development of the OCT systems of high resolution, high sensitivity and high speed for application in various fields are underway. From the viewpoint of research and development of the OCT systems of high resolution, broadness of the spectrum of the light source is required, and from the viewpoint of research and development of the OCT systems of high sensitivity and high speed, high output power of the light source is required. However, broadness and high output power of the light source are apt to involve disturbance of the spectral shape of the measuring light or change with time of the spectral shape and the intensity of the measuring light. Even if broadness and high output power of the light source can be realized, if such a problem is involved, an accurate formation of a tomographic image is difficult due to generation of the pseudo signal described above.

SUMMARY OF THE INVENTION

In view of the foregoing observations and description, the primary object of the present invention is to provide an optical tomography method which can stably obtain an accurate tomographic image even if there is disturbance of the spectral shape of the measuring light or change with time of the spectral shape and the intensity of the measuring light.

Another object of the present invention is to provide an optical tomography system which can carry out such an optical tomography method.

In accordance with the present invention, there is provided an optical tomography method in which light emitted from a light source is divided into measuring light and reference light, the measuring light is projected onto an object of measurement, the reflected light from the object and the reference light are superposed, interference light of the reflected light and reference light which have been superposed is detected, intensities of the reflected light in a plurality of positions in the direction of depth of the object of measurement are detected on the basis of the frequency and the intensity of the detected interference light, and a tomographic image of the object is obtained on the basis of the intensity of the reflected light in each position in the direction of depth, wherein the improvement comprises the steps of measuring spectral components of the measuring light, obtaining a compensating signal by removing the spectral components of the measuring light from an interference signal obtained by detection of the interference light, and providing the compensating signal for detection of the intensities of the reflected light after a Gaussian transform.

It is preferred in the optical tomography method of the present invention that the compensating signal be obtained as $R(k)=\{Si(k)/So(k)\}-1$, wherein $Si(k)$ represents the interference spectrum represented by the interference signal and $So(k)$ represents the spectrum of the measuring light.

Further, in the optical tomography method of the present invention, it is preferred that the Gaussian transform be effected after removing noise components due to division included in the compensating signal. The "division" means dividing the interference signal obtained by detection of the interference light by the spectral components of the measuring light.

Further, in the optical tomography method of the present invention, it is preferred that the intensities of the reflected light be detected after removing noise components due to division included in the signal after a Gaussian transform.

In accordance with the present invention, there is further provided an optical tomography system comprising a light source which emits light, a light dividing means which divides light emitted from the light source into measuring light and reference light, a multiplexing means which superposes the reflected light from an object when the measuring light is projected onto the object of measurement and the reference light, an interference light detecting means which detects interference light of the reflected light and the reference light which have been superposed, and an image obtaining means which detects intensities of the reflected light in a plurality of positions in the direction of depth of the object of measurement on the basis of the frequency and the intensity of the detected interference light and obtaining a tomographic image of the object on the basis of the intensities of the reflected light in each position in the direction of depth, wherein the improvement comprises a means for measuring spectral components of the measuring light, a storage means for storing the measured spectral components, and a calculating means which generates a compensating signal by removing the spectral components of the measuring light from an interference signal obtained by detection of the interference light, and provides the compensating signal for detection of the intensities of the reflected light after a Gaussian transform.

It is preferred that, in the optical tomography system of the present invention, the light source emits low coherent light, and the image obtaining means includes a means for carrying out Fourier transform on the signal after a Gaussian transform so that the optical tomography system of the present invention is formed as an SD-OCT system.

Further, it is possible that, in the optical tomography system of the present invention, the light source emits a wavelength swept laser beam, and the image obtaining means includes a means for obtaining an interferogram in the frequency area of the signal after an Gaussian transform so that the optical tomography system of the present invention is formed as an SS-OCT system.

In accordance with the optical tomography method of the present invention, since the spectral components of the measuring light is removed from the interference signal obtained by detecting the interference light to obtain the compensating signal and the compensating signal undergoes a Gaussian transform, the signal after the Gaussian transform is basically in the form where the interference components are superposed on a signal of a Gaussian waveform irrespective of the spectral components included in the actual measuring light. Accordingly, when the signal after a Gaussian transform is provided for detection of the intensities of the reflected light, an accurate tomographic image can be stably obtain even if there is disturbance of the spectral shape of the measuring light or change with time of the spectral shape and the intensity of the measuring light.

Further, when the Gaussian transform is effected after removing noise components due to said division included in the compensating signal, generation of pseudo signals due to the noise when the intensities of the reflected light are detected can be prevented and generation of an incorrect tomographic image can be prevented. Further, by instead detecting the intensities of the reflected light after removing noise components due to said division included in the signal after a Gaussian transform, a similar result can be obtained.

On the other hand, in accordance with the optical tomography system of the present invention, since a means for measuring spectral components of the measuring light, a storage means for storing the measured spectral components, and a calculating means which generates a compensating signal by removing the spectral components of the measuring light stored in the storage means from an interference signal obtained by detection of the interference light, and provides the compensating signal for detection of the intensities of the reflected light after a Gaussian transform are provided, the optical tomography method of the present invention described above can be carried out.

BRIEF DESCRIPTION OF THE DRAWINGS

FIG. 1 is a schematic diagram that illustrates the construction of an optical tomography system in accordance with a first embodiment of the present invention, FIG. 2 is a side view showing a part of the optical tomography system shown in FIG. 1.

DESCRIPTION OF THE PREFERRED EMBODIMENTS

Figure 3A:
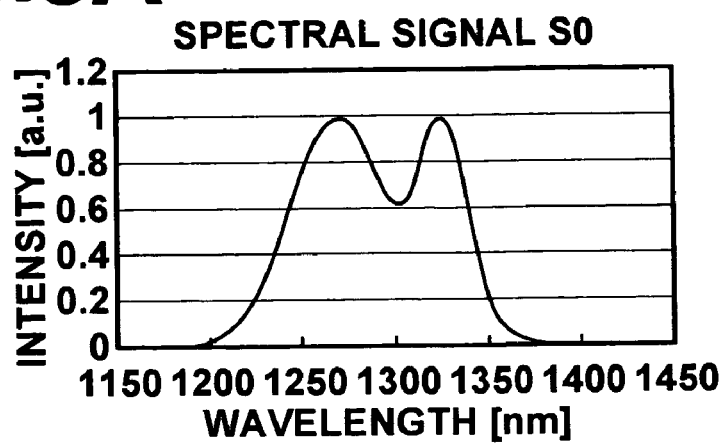
FIG. 3A is a graph showing an example of a waveform of the spectral signal obtained in the system shown in FIG. 1, FIGS. 3B and 3C are graphs showing examples of a waveform of the signals after Fourier-transform.

Embodiments of the present invention will be described in detail with reference to the drawings, hereinbelow. FIG. 1 is a schematic diagram that illustrates an optical tomography system in accordance with a first embodiment of the present invention. The optical tomography system 1 of this embodiment is for obtaining a tomographic image of an object of measurement such as a living tissue or a cell in a body cavity by measuring the SD-OCT. The optical tomography apparatus 1 of this embodiment comprises: a light source unit 10 for emitting a light beam L; a light dividing means 3 for dividing the light beam L emitted from the light source unit 10 into a measuring light beam L1 and a reference light beam L2; an optical path length adjusting means 20 for adjusting the optical path length of the reference light beam L2 divided by the light dividing means 3; an optical probe 30 that irradiates the measuring light beam L1 divided by the light dividing means 3 onto the object Sb; a multiplexing means 4 for multiplexing a reflected light beam L3, which is the measuring light beam L1 reflected from the measurement target S, and the reference light beam L2; and an interference light detecting means 140 for detecting interference light beam L4 of the reflected light beam L3 and the reference light beam L2 which have been multiplexed.

The light source unit 10 comprises a light source 111 such as an SLD (super luminescent diode) or an ASE (amplified spontaneous emission) and an optical system 12 which causes the light beam emitted from the light source 111 to enter an optical fiber FB1. Since the optical tomography system 1 of this embodiment is for obtaining a tomographic image with a part of a living tissue in a body cavity taken as the object Sb, it is preferred that the light source 111 be, for instance, a broad spectral band, ultra short pulse laser where attenuation of light due to scatter and/or absorption when transmitted through the object Sb is minimized.

The light dividing means 3 comprises, for instance, a 2×2 fiber optic coupler and divides the light beam L led thereto by way of the optical fiber FB1 from the light source unit 10 into the measuring light beam L1 and the reference light beam L2. The light dividing means 3 is optically connected to two optical fibers FB2 and FB3, and the measuring light beam L1 is propagated through the optical fiber FB2 while the reference light beam L2 is propagated through the optical fiber FB3. In this embodiment, the light dividing means 3 also functions as the multiplexing means 4.

A probe 30 is optically connected to the optical fiber FB2, and the measuring light beam L1 is led to the probe 30 from the optical fiber FB2. The probe 30 is inserted into a body cavity, for instance, through a forceps port by way of a forceps channel and is removably mounted on the optical fiber FB2 by an optical connector 31.

The optical path length adjusting means 20 is disposed on the side of the optical fiber FB3 radiating the reference light beam L2. FIG. 2 is a view schematically showing an example of the optical path length adjusting means 20 and please, refer also to FIG. 2, in the following description. The optical path length adjusting means 20 changes the optical path length of the reference light beam L2 in order to adjust a position from which a tomographic image is initiated to be read out and comprises a reflecting mirror 22 which reflects the reference light beam L2 radiated from the optical fiber FB3, a first lens 21a disposed between the reflecting mirror 22 and the optical fiber FB3, and a second lens 21b disposed between the first lens 21a and the reflecting mirror 22.

The first lens 21a makes parallel the reference light beam L2 radiated from the core of the optical fiber FB3 and at the same time, collects the reference light beam L2 reflected by the reflecting mirror 2 on the core of the optical fiber FB3. The second lens 21b collects the reference light beam L2 made parallel by the first lens 21a on the reflecting mirror 22 and at the same time, makes parallel the reference light beam L2 reflected by the reflecting mirror 22. That is, the first and second lenses 21a and 21b form a confocal optical system.

Accordingly, the reference light beam L2 radiated from the optical fiber FB3 is turned to a parallel light by the first lens 21a and is collected on the reflecting mirror 22 by the second lens 21b. Subsequently, the reference light beam L2 reflected by the reflecting mirror 22 is turned to a parallel light by the second lens 21b and is collected on the core of the optical fiber FB3 by the first lens 21a.

The optical path length adjusting means 20 is further provided with a base 23 to which the second lens 21b and the reflecting mirror 22 are fixed and a mirror moving means 24 which moves the base 23 in the direction of the optical axis of the first lens 21a. In response to movement of the base 23 in the direction of arrow A, the optical path length of the reference light beam L2 can be changed.

The multiplexing means 4 shown in FIG. 1 comprises a 2×2 fiber optic coupler as described above, and multiplexes the reference light beam L2 which has been shifted in its frequency and changed in its optical path length by the optical path length adjusting means 20 and the reflected light beam L3 from the object Sb to emit the multiplexed light beam toward the interference light detecting means 140 by way of an optical fiber FB4.

The interference light detecting means 140 detects interference light L4 of the reflected light beam L3 and the reference light beam L2 which have been multiplexed, and comprises a collimator lens 141 which makes parallel the interference light beam L4 radiated from the optical fiber FB4, a spectral means 142 which divides the interference light beam L4 having a plurality of wavelength bands by the wavelength bands and a light detecting means 144 which detects each wavelength band of the interference light beam L4 divided by the spectral means 142.

The spectral means 142 comprises, for instance, a diffraction grating element, and divides the interference light beam L4 entering it to output the divided interference light beam L4 to the light detecting means 144. The light detecting means 144 is formed by, for instance, a CCD element which comprises a plurality of one- or two-dimensionally arranged photosensors and each of the photosensors detects each wavelength band of the interference light beam L4 divided as described above.

The light detecting means 144 is connected to an image obtaining means 50 which is connected to a display system formed, for instance, by a CRT or a liquid crystal display system. The light detecting means 144 is further connected to a storage means 70. The image obtaining means 50 and the storage means 70 comprises, for instance, a computer system such as a personal computer.

Operation of the optical tomography system 1 having a structure described above will be described, hereinbelow. When a tomographic image is to be obtained, the optical path length is first adjusted by moving the base 23 in the direction of the arrow A so that the object Sb is positioned in the measurable area. The light beam L is emitted from the light source unit 10 and the light beam L is divided into the measuring light beam L1 and the reference light beam L2. The measuring light beam L1 is radiated from the probe 30 toward a body cavity and is projected onto the object Sb. Then the reflected light beam L3 from the object Sb and the reference light beam L2 are multiplexed, and the interference light beam L4 of the reflected light beam L3 and the reference light beam L2 is detected. Information on the direction of depth of the object Sb is obtained by carrying out frequency analysis on the detected interference light beam L4 in the image obtaining means 50.

When the measuring light beam L1 is one-dimensionally scanned with respect to the object Sb, for instance, by rotating the probe 30, since information on the direction of depth of the object Sb is obtained at each part along the direction of this scan, a tomographic image of a cross-section including the direction of this scan can be obtained. Further, by scanning the measuring light beam L1 in the second direction perpendicular to the direction of the above scan with respect to the object Sb, it is possible to obtain also a tomographic image of a cross-section including the second direction.

When the base 23 is moved in the direction of the arrow A in order to adjust the optical path length (FIG. 2), the focus of the first lens 21a is never moved from the core of the optical fiber FB3. Further, the focus of the second lens 21b is never moved from the reflecting mirror 22. By this, reduction of the amount of the reference light beam L2 when reentering the optical fiber FB3 after adjusted with its optical path length can be prevented, whereby deterioration of the image quality due to change of the intensity of the interference light beam L4 every time the optical path length is adjusted can be prevented.

In the light detecting means 144 of the interference light detecting means 140, the interference light beam L4 where Fourier-transformed information on the reflection is added to the spectrum of the measuring light beam L1 is observed. Accordingly, information on the direction of depth of the object Sb is obtained by carrying out in the image obtaining means 50 frequency analysis on the interference light beam L4 detected in the interference light detecting means 140.

The obtainment of the information on the direction of depth of the object Sb will be described in more detail. The wave motion of the reflection with respect to the wave motion $V^{(r)}_T(t)$ from the light source is expressed by the following formulae (1) and (2) when information on the reflection of the object Sb such as a living tissue is represented by $R(\tau)$.

$$V^{(r)}_T(t) \otimes R(t) \quad (1)$$

$$V^{(r)}_T(t) + V^{(r)}_T(t) \otimes R(t) \quad (2)$$

Accordingly, autocorrelation of interference light wave is expressed as follows.

$$\int_{-\infty}^{\infty} \{V^{(r)}\tau(t) + V^{(r)}\tau(t) \otimes R(t)\}\{V^{(r)}\tau(t+\tau) + \quad (3)$$
$$V^{(r)}\tau(t+\tau) \otimes R(t+\tau)\} dt = \int_{-\infty}^{\infty} \{V^{(r)}\tau(t)V^{(r)}\tau(t+\tau)\} dt +$$
$$\int_{-\infty}^{\infty} V^{(r)}\tau(t)V^{(r)}\tau(t+\tau) \otimes R(t) dt +$$
$$\int_{-\infty}^{\infty} V^{(r)}\tau(t)V^{(r)}\tau(t+\tau) \otimes R(t+\tau) dt +$$
$$\int_{-\infty}^{\infty} V^{(r)}\tau(t)V^{(r)}\tau(t+\tau) \otimes R(t)R(t+\tau) dt$$

Since the fourth term is negligible and the third term becomes an integration of a minus time by carrying out a substitution of $t+\tau \rightarrow t$ and actually 0, $$\int_{-\infty}^{\infty} \{V^{(r)}\tau(t) + V^{(r)}\tau(t) \otimes R(t)\} \quad (4)$$
$$\{V^{(r)}\tau(t+\tau) + V^{(r)}\tau(t+\tau) \otimes R(t+\tau)\} dt =$$
$$\int_{-\infty}^{\infty} \{V^{(r)}\tau(t)V^{(r)}\tau(t+\tau)\} dt + \int_{-\infty}^{\infty} V^{(r)}\tau(t)V^{(r)}\tau(t+\tau) \otimes R(t) dt$$

When formula (4) is considered on the basis of time regions, a waveform obtained by carrying out convolutional integration on the autocorrelation of the light source itself and the information on the reflection of the object Sb convoluted with the autocorrelation function (coherence function) of the light source itself is observed.

Further, when considered on the basis of spectral regions, formula (4) is written in the form of Fourier transform as follows.

$$\int_{-\infty}^{\infty} \{V^{(r)}\tau(t)V^{(r)}\tau(t+\tau)\} dt + \int_{-\infty}^{\infty} V^{(r)}\tau(t)V^{(r)}\tau(t+\tau) \otimes R(t) dt = \quad (5)$$
$$2\int_{0}^{\infty} S(v)e^{-i2\pi vt} dv + 2\int_{0}^{\infty} S(v) \cdot F(R(t))e^{-i2\pi vt} dv =$$
$$2\int_{0}^{\infty} S(v)\{1 + F(R(t))\}e^{-i2\pi vt} dv$$

In formula (5), Fourier transform of the convolutional integration is abbreviated as apparent. By this, a waveform obtained by adding the Fourier-transformed information on the reflection to the spectrum of the light source is observed as shown in FIG. 9A.

Figure 9A:
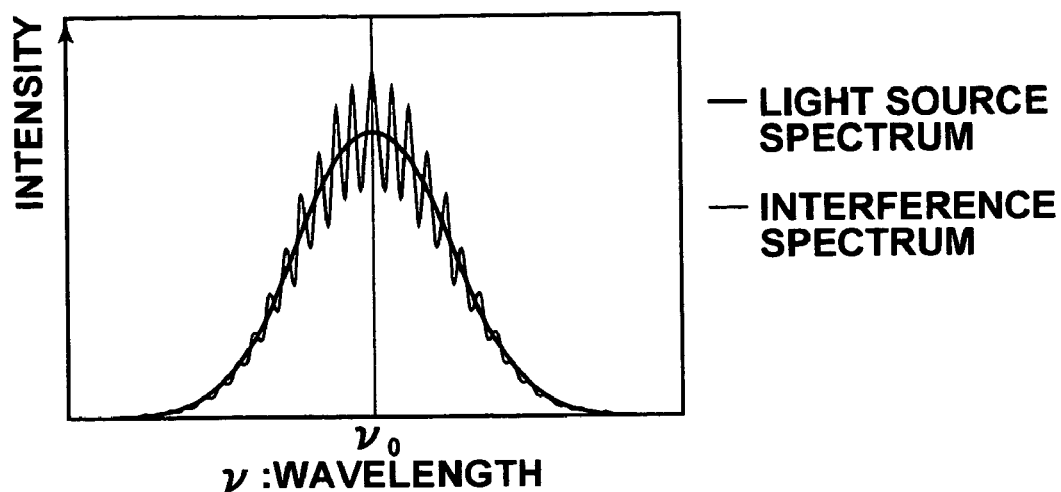
FIG. 9A is a graph showing an example of a waveform of the interference signal obtained in the system shown in FIG. 1.
Figure 9B:
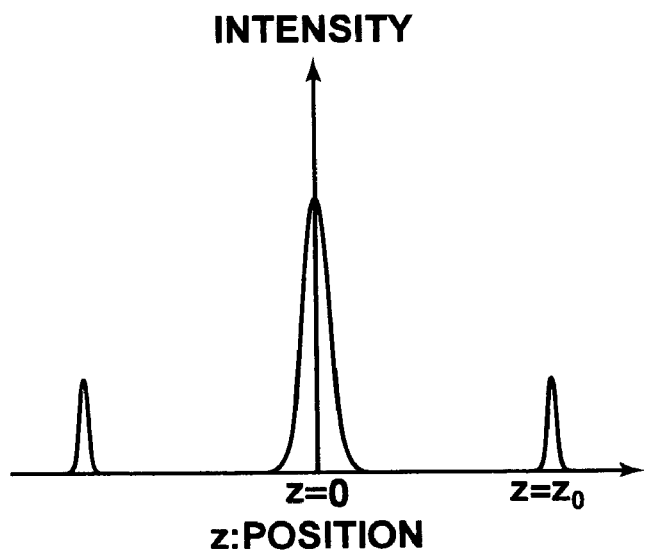
FIG. 9B is a graph showing an example of a waveform of the signal after Fourier-transform.

By frequency-analyzing in the image obtaining means 50 the interference light beam L4 detected as shown in FIG. 9A in the interference light detecting means 140, information on the reflection in positions of depth z can be obtained as shown in FIG. 9B. The frequency analysis is effected, for instance, by Fourier-transforming the interference signal which is obtained on the basis of output of the light detecting means 144 and has a waveform such as shown in FIG. 9A. That is, by the Fourier-transform, a signal representing that an interface of reflection exists in position $z_0$ of depth as shown in FIG. 9B.

By obtaining a tomographic image by the use of spectral interference as described above, the mechanical movable part necessary to an OCT system where the optical path lengths of the reflected light beam L3 and the reference light beam L2 are changed to change the depth of measurement becomes unnecessary and the tomographic image can be rapidly obtained.

Stably obtaining an accurate tomographic image even if there is disturbance of the spectral shape of the measuring light beam L1 or fluctuation of the spectral shape and the intensity of the measuring light beam L1 will be described next. When the spectral shape of the measuring light beam L1 or the light beam L is an ideal Gaussian shape, a component representing that an interface of reflection exists in position $z_0$ of depth only appears in the signal shown in FIG. 9B. However, when the light source 111 itself includes ripples, they are the same as the Fourier-transformed function of the information on the reflection superposed on the spectrum of the light source in FIG. 9A and appear as a side lobe in the Fourier-transformed signal shown in FIG. 9B. Since being apparently the same as the component representing that an interface of reflection exists in a position of depth, the side lobe forms noise for the information on the reflection and deteriorates the quality of the tomographic image.

A method of overcoming this problem will be qualitatively discussed, hereinbelow. The above formula (5) is reviewed and the interference signal obtained on the spectral surface is rewritten as follows.

$$Si(k)=So(k)\{1+R(k)\} \quad (6)$$

wherein So(k) represents the signal component representing the spectrum of the light source and R(k) represents the reflection component. Accordingly, when the spectrum of the light source as the prior information is known, a compensating signal R(k) where, the spectral component of the measuring light beam is only removed and the reflection component only is extracted, can be obtained by calculation of the following formula (7).

$$R(k)=\{Si(k)/So(k)\}-1 \quad (7)$$

Then when the compensating signal R(k) is Gaussian-transformed, a signal equivalent to the interference signal obtained when a measuring light beam whose spectral shape is an ideal Gaussian shape is used is obtained. When the signal is Fourier-transformed, appearance of the above noise can be prevented.

On the basis of those described above, in the system of FIG. 1, prior to obtaining a tomographic image in the manner described above, the light beam L is introduced into the interference light detecting means 140 as it is, and the spectrum of the light beam L is measured by the light detecting means 144. A signal So representing the spectrum is stored in the storage means 70 as compensating data. The image obtaining means 50 calculates the formula (7) on the basis of the obtained signal Si(k) and the spectral signal So(k) read out from the storage means 70 when a tomographic image is to be obtained and the compensating signal R(k) obtained is Gaussian-transformed, and Fourier-transform is carried out on the Gaussian-transformed signal. With this arrangement, even if the spectral shape of the measuring light beam L1 is deviated from Gaussian shape, or even if there is fluctuation of the spectral shape and the intensity of the measuring light beam L1, appearance of the above noise can be prevented and an accurate tomographic image can be stably obtained. As can be understood from the description above, the image obtaining means 50 form the calculating means of the present invention.

Figure 3B:
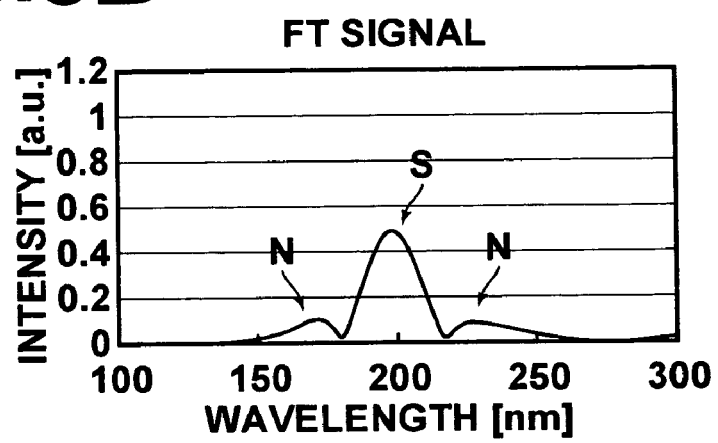

The above result will be specifically described with reference to FIGS. 3 to 8, hereinbelow. In FIGS. 3 to 8, denotations of the signals So(k) and Si(k) are simplified as S0 and S1. These denotations will be used, hereinbelow. When the spectral signal S0 is, for instance, such as shown in FIG. 3A, if the information on the direction of depth is obtained by the use of the spectral signal S0, the Fourier-transformed signal (will be referred to as "FT signal", hereinbelow) is as shown in FIG. 3B, as an example. This is the example when the reflection interface is in a position of 200 µm or so away from the surface of the object Sb in the direction of depth, and the FT signal has a component (indicated at S in FIG. 3B) corresponding to the position. Though the components indicating as if there are reflection interfaces appears on opposite sides thereof, they are noises (indicated at N in FIG. 3B) due to that the spectral shape of the measuring light beam L1 deviates from Gaussian shape. In this example, the intensity of the above signal component S is 0.48 in a relative value, the intensities of the noises N are 0.095 and 0.08, respectively in relative values, and the ratios of the intensity of the noises N to the signal component S are 20% and 17%, respectively.

Figure 3C:
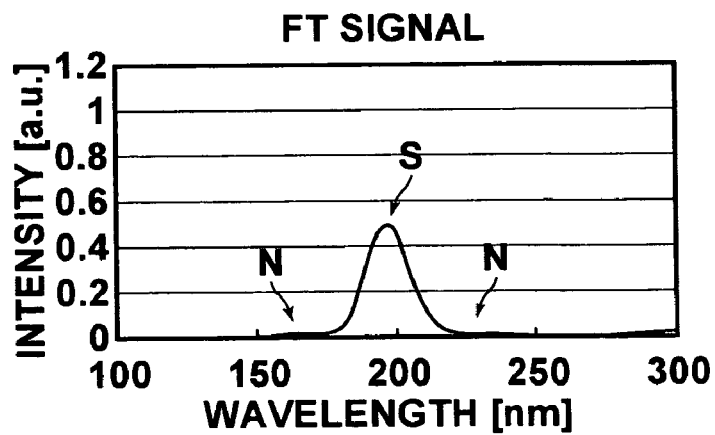

Whereas, when the spectral signal S0 is similarly such as shown in FIG. 3A, the FT signal is as shown in FIG. 3C, as an example if the information on the direction of depth is obtained by the use of the spectral signal S0, after the above Gaussian transform. The object Sb at this time is the same as in the above description. Also in this case, noises N are generated on opposite sides of the signal component by the reflection interface. At this time, the ratios of the intensity of the noises N to the signal component S are 4.2% and 3.1% and substantially reduced from the ratios 20% and 17% when the above Gaussian transform is not effected.

Figure 4A:
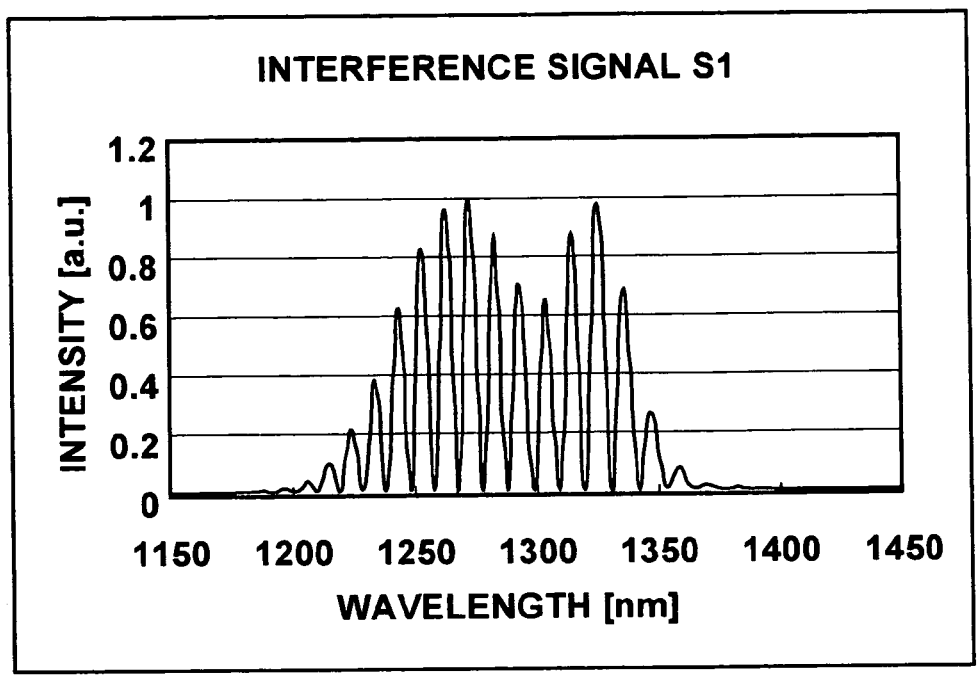
FIG. 4A is a graph showing an example of a waveform of the interference signal obtained in the system shown in FIG. 1.
Figure 4B:
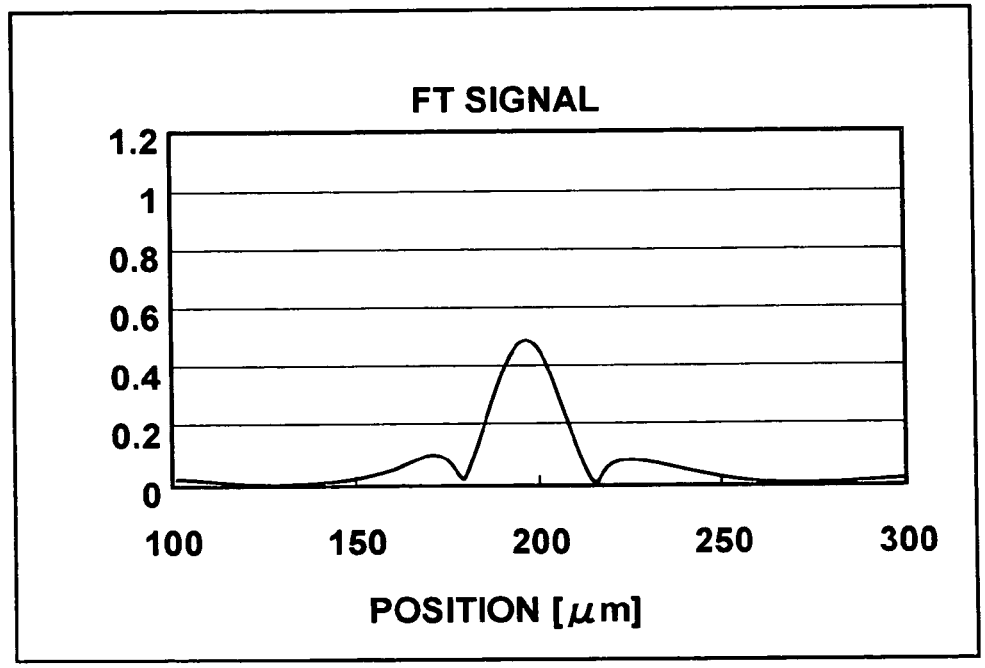
FIG. 4B is a graph showing an example of a waveform of the signal after Fourier-transform.

The waveforms of the signals obtained in the above description will be described with reference to FIGS. 4 to 8, hereinbelow. The interference signal S1 has a waveform where deviated from the Gaussian shape as shown in FIG. 4A, and the FT signal is as shown in FIG. 4B. FIG. 4B is corresponding to FIG. 3C. The above compensating signal R(k), that is, S1/S0−1 is as shown in FIG. 5A and the FT signal obtained by Fourier-transforming the compensating signal R(k) is as shown in FIG. 5B.

Figure 5A:
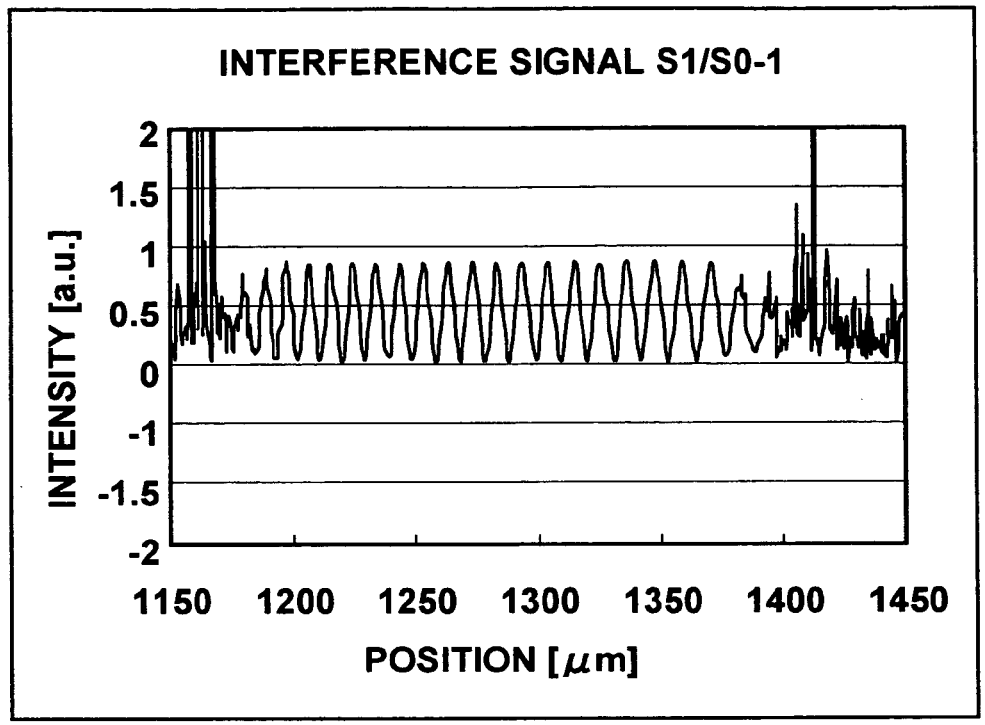
FIG. 5A is a graph showing an example of a waveform of the compensating signal obtained by removing the spectral component of the measuring light beam from the interference signal obtained in the system shown in FIG. 1.
Figure 5B:
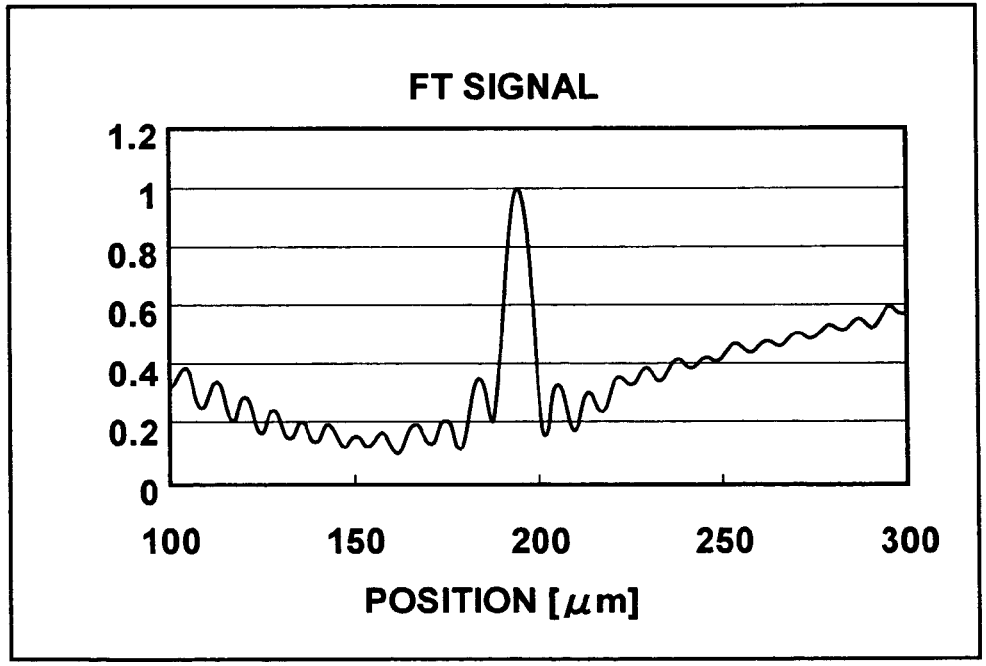
FIG. 5B is a graph showing an example of a waveform of the signal after Fourier-transform.
Figure 7A:
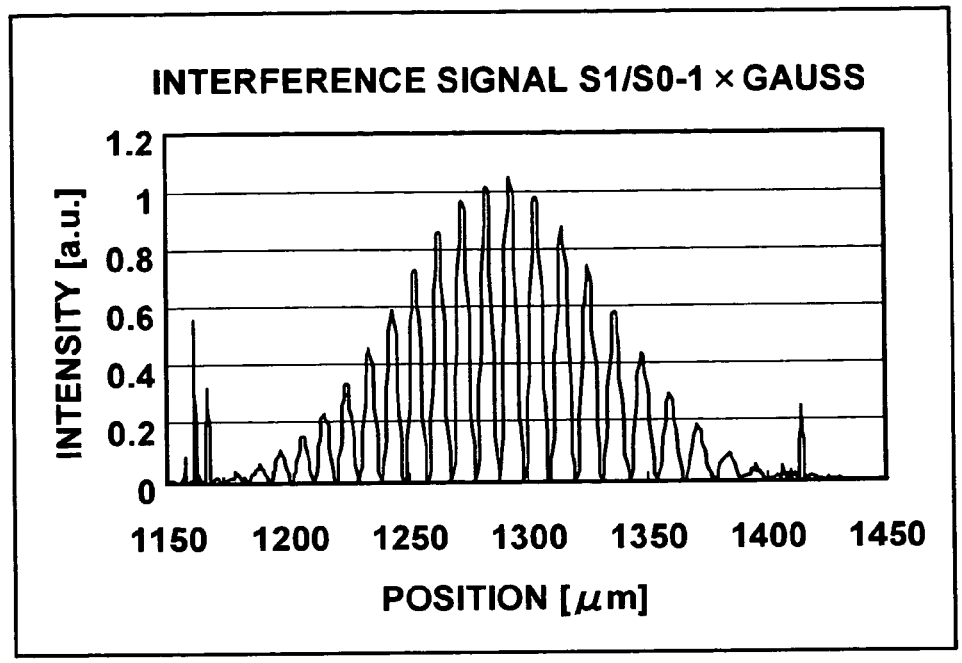
FIG. 7A is a graph showing an example of a waveform of the signal obtained by Gaussian-transforming the compensating signal shown in FIG. 5A.

As shown in FIG. 5A, noise (large amplitude parts on opposite end portions of the waveform) is generated in a weak part of the spectral signal S0 due to division in the compensating signal S1/S0−1. Though not effecting in the above example, if Gaussian transform is carried out on this compensating signal S1/S0−1 as it is, a signal of a waveform such as shown in FIG. 7A can be obtained. The FT signal obtained by Fourier-transforming it is as shown in FIG. 7B.

Figure 6A:
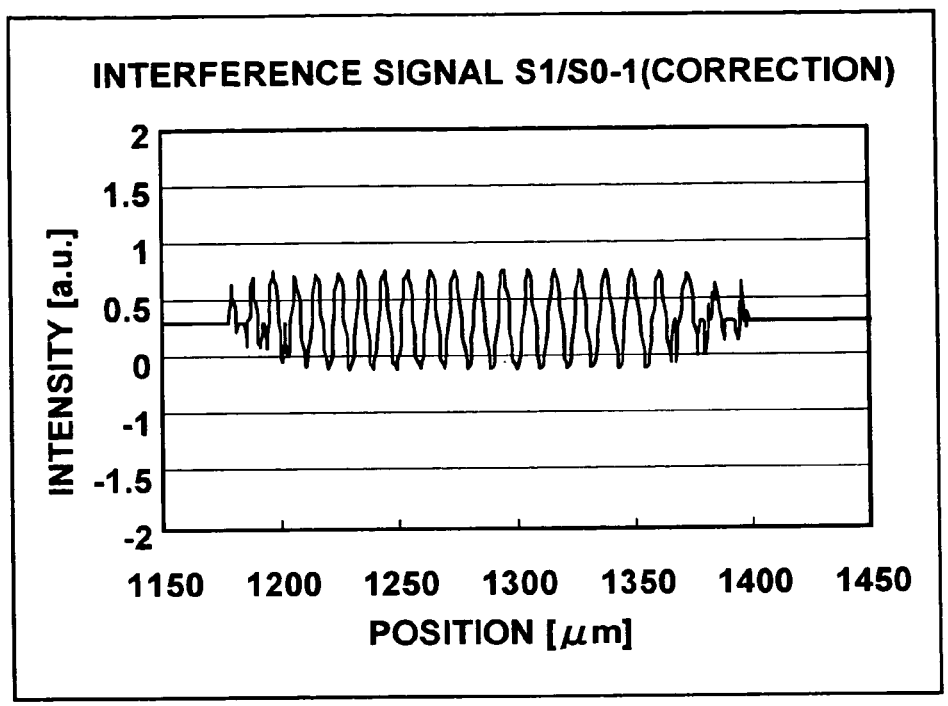
FIG. 6A is a graph showing an example of a waveform of the correction signal obtained by removing the noise component from the compensating signal shown in FIG. 5A.
Figure 6B:
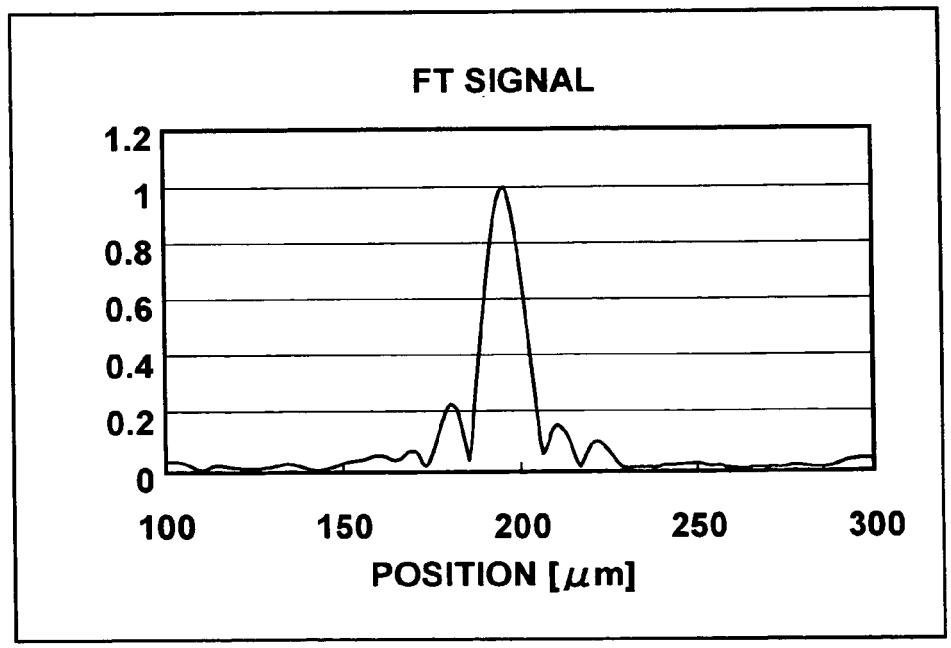
FIG. 6B is a graph showing an example of a waveform of the signal after Fourier-transform.
Figure 8A:
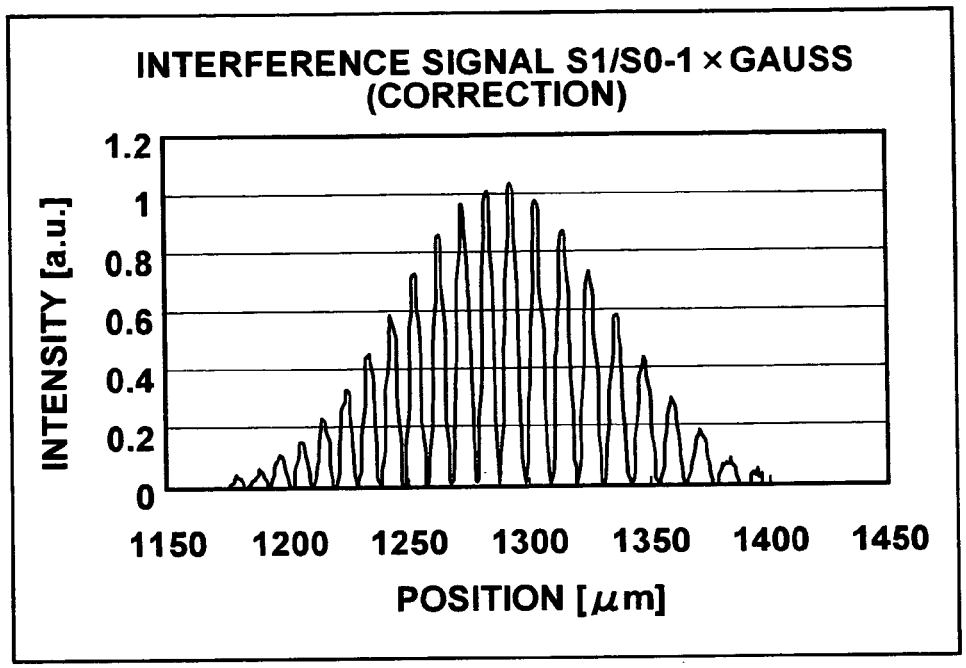
FIG. 8A is a graph showing an example of a waveform of the signal obtained by Gaussian-transforming the correction signal shown in FIG. 6A.
Figure 8B:
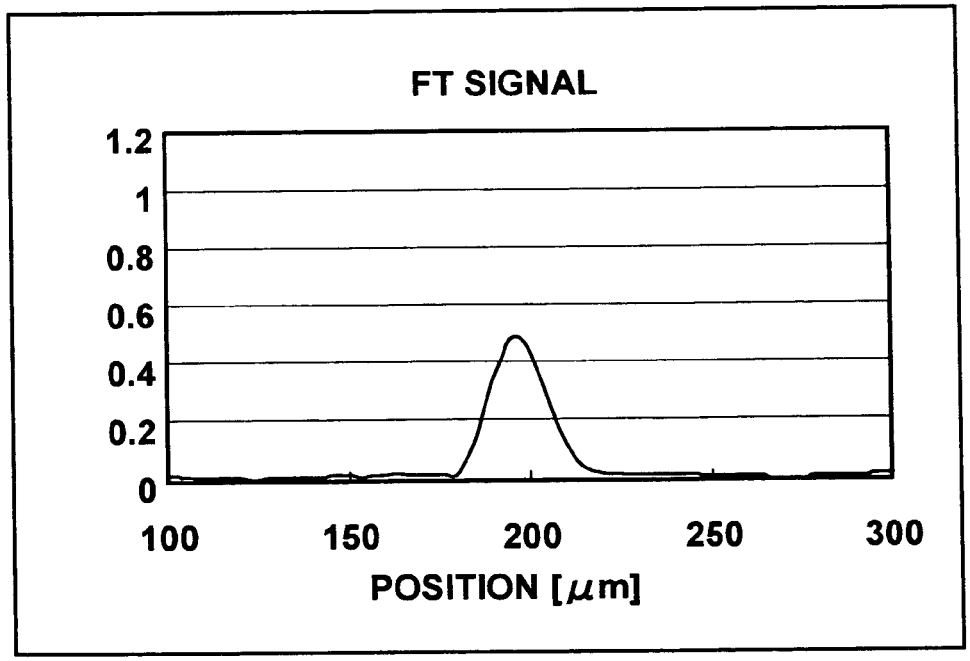
FIG. 8B is a graph showing an example of a waveform of the signal after Fourier-transform.

In the above example, Gaussian transform is not carried out on the compensating signal S1/S0−1 as it is, and a correction signal such as shown in FIG. 6A is once obtained by removing the noise shown in FIG. 5A. BY carrying out Gaussian transform on the correction signal, a signal such as shown in FIG. 8A is obtained. The signal has a waveform as if an interference component is superposed on a spectral signal of an ideal Gaussian shape. The FT signal obtained by Fourier-transforming it is as shown in FIG. 8B. That is, FIG. 8B is corresponding to FIG. 3C. The FT signal obtained by Fourier-transforming the correction signal shown in FIG. 6A is as shown in FIG. 6B.

As will be understood by comparison of the waveforms shown in FIG. 7A and FIG. 8A, noise remains in a weak part of the spectral signal S0 due to division in the former. Accordingly, in order to obtain a more accurate tomographic image, it is preferred that a correction signal such as shown in FIG. 6A be once obtained by removing the noise shown in FIG. 5A and Gaussian-transform be carried out on the correction signal.

Figure 7B:
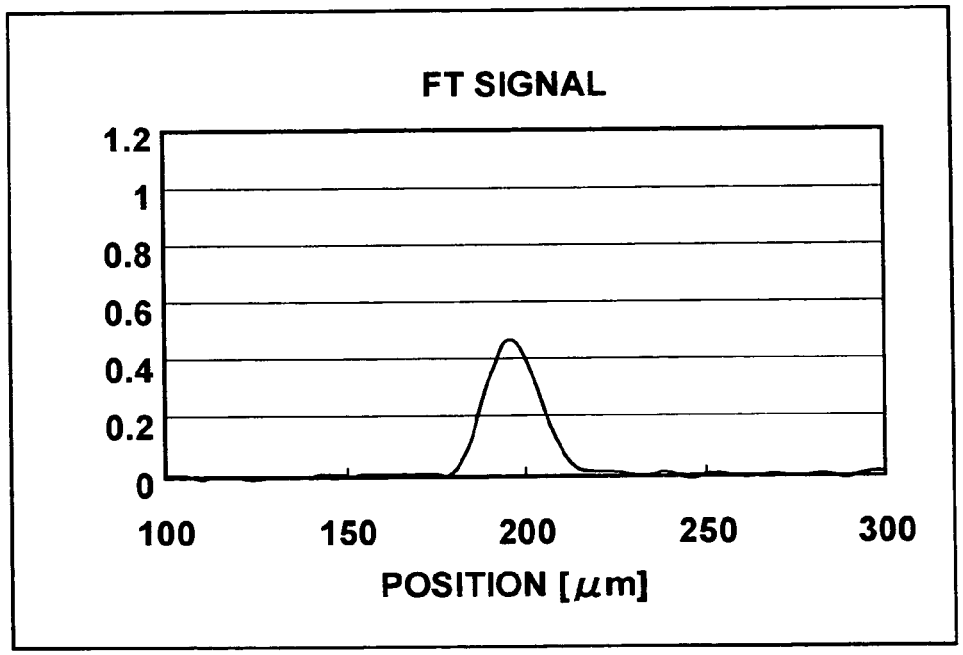
FIG. 7B is a graph showing an example of a waveform of the signal after Fourier-transform.

However, as will be understood by comparison of FIG. 4B and FIG. 7B, since an effect of suppressing generation of a pseudo signal is obtained by Gaussian-transform, removing the noise may be carried out as necessary. A similar effect can be obtained even by removing the noise component from the signal after Gaussian-transform shown in FIG. 7A instead of removing the noise shown in FIG. 5A to once obtain the correction signal shown in FIG. 6A and carrying out Gaussian-transform on the correction signal.

The spectral signal S0 stored in the storage means 70 basically may be measured once and can be measured, for instance, by connecting the optical fiber FB1 to the interference light detecting means 140 or by connecting the optical fiber FB2, which has been connected to the dividing means 3, or the optical fiber FB3 to the interference light detecting means 140 when making the optical tomography system 1.

When the spectral shape and/or intensity of the measuring light beam L1 can fluctuate with time, it is preferred that measurement of the spectral signal S0 be effected at desired times after the optical tomography system 1 comes to be practically used to update the spectral signal S0 to be stored in the storage means 70. Such update may be effected, for instance, in a form where the update is effected every time the optical tomography system 1 is started in the practical use or when a predetermined time such as one week or one month is elapsed. Further, when the result of measurement at desired times is in a predetermined width of a spectral signal S0 which is stored in the storage means 70 at that time, the update may be abbreviated.

The above processing of obtaining the compensating signal S1/S0−1 and Gaussian-transforming it may be effected every time the tomographic image is obtained or the Gaussian-transform may be abbreviated when the disturbance of the measured spectral signal S0 is in a predetermined width of a Gaussian shape while measurement of the spectral signal S0 is effected at desired times.

Figure 10:
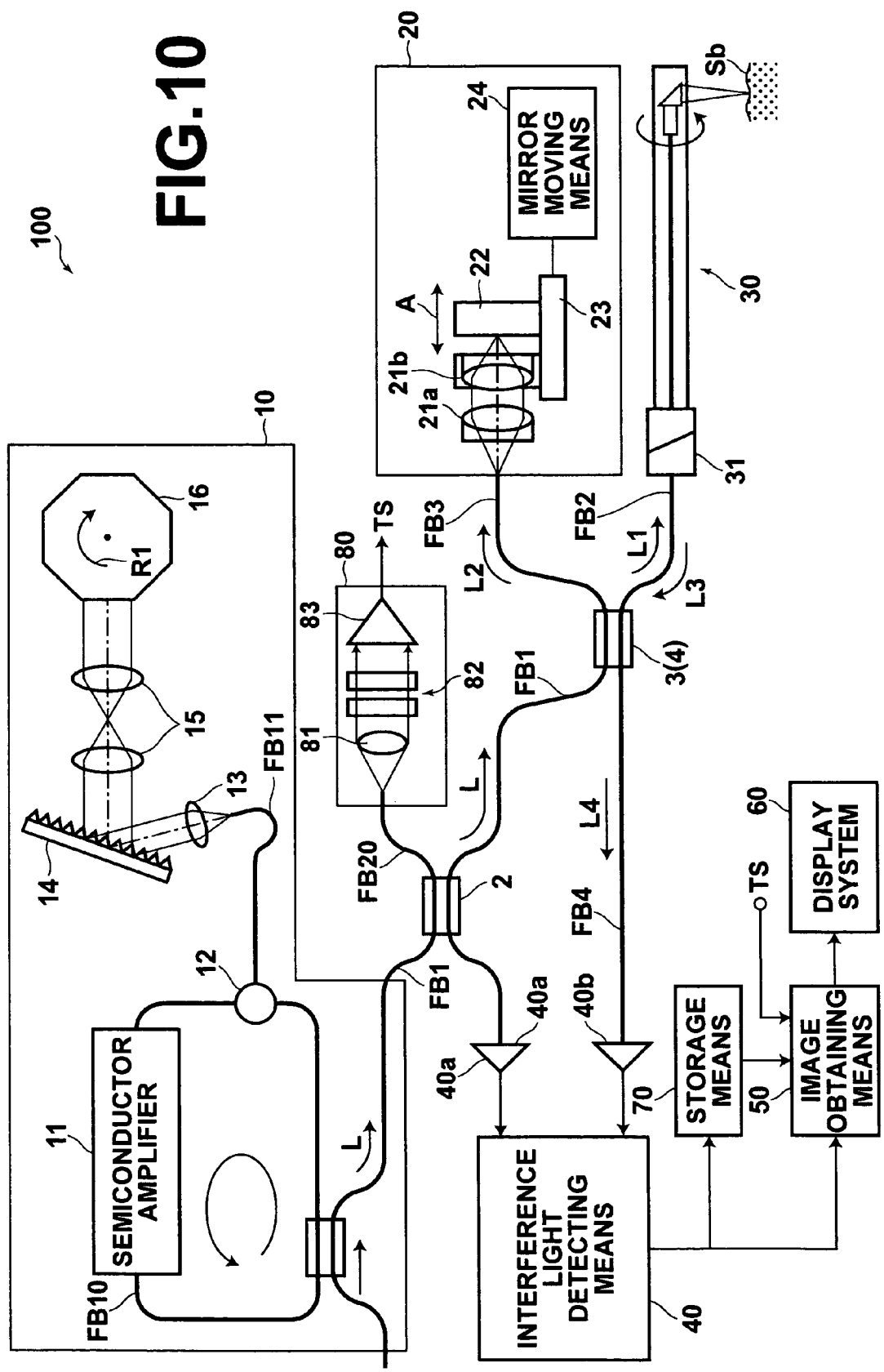
FIG. 10 is a schematic diagram that illustrates an optical tomography system in accordance with a second embodiment of the present invention.

An optical tomography system in accordance with a second embodiment of the present invention will be described next with reference to FIG. 10. The optical tomography system 100 of this embodiment obtains a tomographic image through measurement of SS-OCT and specifically differs from the optical tomography system 1 shown in FIG. 1 in the structure of the light source unit and the interference light detecting means. In FIG. 10, the elements analogous to those shown in FIG. 1 are given the same reference numerals and will not be described unless necessary.

The light source unit 10 of this embodiment emits the laser light beam L while sweeping the frequency thereof at a predetermined period. Specifically, the light source unit 10 comprises: a semiconductor optical amplifier 11 (semiconductor gain medium); and an optical fiber FB10 and the optical fiber FB10 is connected to both ends of the semiconductor optical amplifier 11. The semiconductor optical amplifier 11 functions to emit a slight amount of light into a first end of the optical fiber FB10, when a drive current is injected thereinto, and to amplify the light that enters it from a second end of the optical fiber FB10. When the drive current is supplied to the semiconductor optical amplifier 11, a pulse-like laser light beam L is emitted to an optical fiber FB1 from an optical oscillator formed by the semiconductor optical amplifier 11 and the optical fiber FB10.

Further, an optical divider 12 is linked to the optical fiber FB10, and a portion of the light beam that propagates within the optical fiber FB10 is emitted into an optical fiber FB11. The Light beam, which is emitted from the optical finer FB11, passes through a collimating lens 13, a diffraction grating 14, and an optical system 15, to be reflected by a rotating polygon mirror 16. The light beam reflected by the rotating polygon mirror 16 passes through an optical system 15, the diffraction grating 14, and the collimating lens 13, to reenter the optical fiber FB11.

The rotating polygon mirror 16 rotates in the direction indicated by arrow R1, to vary the angle of each reflective surface thereof with respect to the optical axis of the optical system 15. Thereby, only a light beam having a specific frequency, from among the light spectrally split by the diffraction grating 14, is returned to the optical fiber FB11. The frequency of the light beam that reenters the optical fiber FB11 is determined by the angle formed by the optical axis of the optical system 15 and the reflective surface of the rotating polygon mirror 16. The light beam of a specific frequency band that enters the optical fiber FB11 is caused to enter the optical fiber FB10 by the optical divider 12. As a result, the laser light beam L of the specific frequency is emitted toward the optical fiber FB1.

Figure 11:
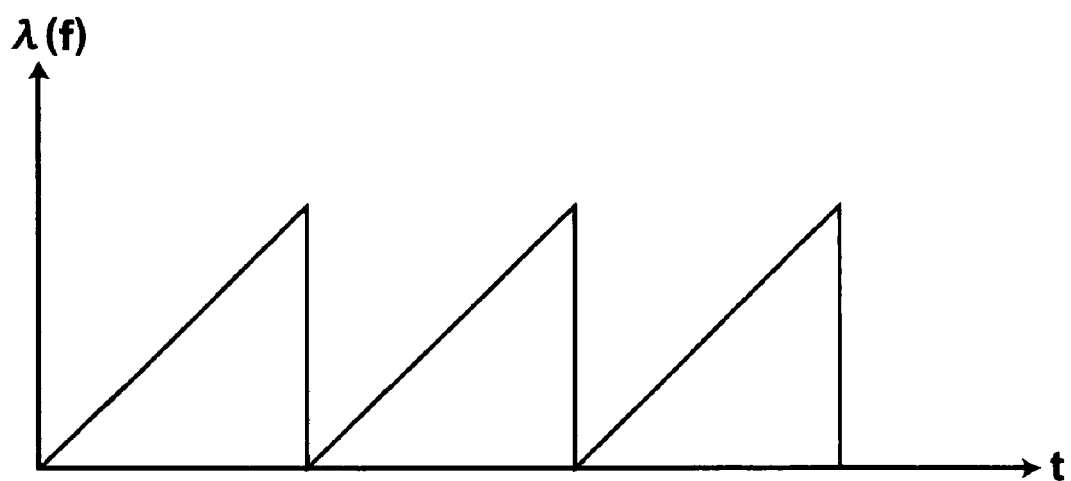
FIG. 11 is a graph showing the wavelength sweep of the measuring light beam employed in the system shown in FIG. 10.

Accordingly, when the rotating polygon mirror 16 is rotated in the direction of arrow R1 at a constant speed, the wavelength λ of the light beam that reenters the optical fiber FB11 is varied with time t at a constant period as shown in FIG. 11. In this manner, the laser light beam L having the swept wavelength is emitted to the optical fiber FB1 from the light source unit 10.

The interference light detecting means 40 detects the interference light beam L4 of the reflected light beam L3 and the reference light beam L2 multiplexed by the multiplexing means 4. The image obtaining means 50 carries out frequency analysis on the interference light beam L4 detected by the interference light detecting means 40 to calculate the intensity of the reflected light beam L3 at each depth position within the object Sb. Thereby, tomographic images of the measurement target S are obtained. The obtained tomographic images are displayed by the display system 60. In the embodiment shown in FIG. 10, an optical detector 40a which detects the intensity of the laser light beam L branched from an fiber optic coupler 2 of the optical fiber FB1 and an optical detector 40b which detects the intensity of interference light beam L4 are provided and the interference light detecting means 40 has a function of adjusting the balance of the intensity of the interference light beam L4 on the basis of the output of the optical detector 40a.

Here, detection of the interference light beam L4 in the interference light detecting means 40 and image generation in the image obtaining means 50 will be described briefly. Note that a detailed description of these two points can be found in M. Takeda, "Optical Frequency Scanning Interference Microscopes", Optical Engineering Contact, Vol. 41, No. 7, pp. 426-432, 2003.

When the measuring light beam L1 is irradiated onto the measurement object Sb, the reflected light beams L3, which are reflected at various depths within the object Sb and the reference light beam L2 interfere with each other, with various optical path length differences. By designating the optical intensity of the interference pattern with respect to each of the optical path length differences l as S(l), the optical intensity I(k) detected by the interference light detecting means 40 can be expressed as:

$$I(k)=\int_0^\infty S(l)[1+\cos(kl)]dl \quad (8)$$

wherein:
k: wave number
l: optical path length difference.

The above formula (8) may be considered as being provided as an interferogram of an optical frequency range, in which the wave number k=ω/c is a variable. For this reason, the image obtaining means 50 administers Fourier transform on the interference fringes detected by the interference light detecting means 40 and carries out frequency analysis to determine the optical intensity S(I) of the interference light beam L4. Thereby, information regarding the distance from a measurement initiating position within the object Sb and the intensity of the reflected light beam can be obtained, and generation of tomographic images is enabled.

Also in the optical tomography system 100 of this embodiment, where a tomographic image is generated in the manner described above, an accurate tomographic image can be stably obtained even if there is disturbance of the spectral shape of the measuring light or change with time of the spectral shape and the intensity of the measuring light as in the first embodiment, by measuring the spectrum of the laser light beam L before obtaining a tomographic image, obtaining a compensating signal S1/S0−1 on the basis of the spectral signal S0 read out from the storage means 70 when a tomographic image is to be obtained, and carrying out frequency analysis on the compensating signal S1/S0−1 after Gaussian transform.

The calculation of S1/S0 when obtaining the compensating signal S1/S0−1 must be carried out between the signals S1 and S0 having the same wave numbers. For this purpose, a wave number trigger generating portion 80 is connected to the optical fiber FB20 connected to the fiber optic coupler 2 in this embodiment. The wave number trigger generating portion 80 comprises a collimator lens 81 which makes parallel the laser light beam L emitted from the optical fiber FB20, a Fabry-Perot etalon 82 inserted into the optical path of the parallel laser light beam L, and a signal generator 83 which receives the laser light beam L passing through the Fabry-Perot etalon 82.

When the spectrum of the laser light beam L is measured and when a tomographic image is obtained, the laser light beam L propagating through the optical fiber FB20 is received by the signal generator 83 as described above. The laser light beam L reaching the signal generator 83 at this time periodically fluctuates by specific wavelengths determined by the characteristics of the Fabry-Perot etalon 82 according to the wavelength which is being swept (that is, the wave number). Accordingly, when a trigger signal TS is generated every time, for instance, the laser light beam L which fluctuates in its intensity takes a peak intensity in the signal generator 83, the generating order of the trigger signals generated in sequence with time correspond to the wave number of the laser light beam L.

Accordingly, if the signals S1 and S0 are sampled every time the trigger signal TS is input when the signals S1 and S0 are obtained for the above calculation in the image obtaining means 50 and the calculation of S1/S0 is carried out between the signals S1 and S0 which are the same in the sampling order, the calculation of S1/S0 can be carried out between the signals S1 and S0 having the same wave numbers.

That a more accurate tomographic image can be obtained by Gaussian-transforming the correction signal obtained by removing the noise included in the compensating signal S1/S0−1 (FIG. 5A) or by removing the noise from the compensating signal S1/S0−1 after Gaussian-transform is the same as the first embodiment.

What is claimed is:

1. An optical tomography method in which
light emitted from a light source is divided into measuring light and reference light,
the measuring light is projected onto an object of measurement,
the reflected light from the object and the reference light are superposed,
interference light of the reflected light and reference light which have been superposed is detected,
intensities of the reflected light in a plurality of positions in the direction of depth of the object of measurement are detected on the basis of the frequency and the intensity of the detected interference light, and
a tomographic image of the object is obtained on the basis of the intensity of the reflected light in each position in the direction of depth, wherein the improvement comprises the steps of
measuring spectral components of the measuring light,
obtaining a compensating signal by removing the spectral components of the measuring light from an interference signal obtained by detection of the interference light,
applying a Gaussian transform to the compensating signal; and
providing the Gaussian transformed compensating signal for detection of the intensities of the reflected light.

2. The optical tomography method as defined in claim 1 in which the compensating signal is obtained as R(k)={Si(k)/So(k)}−1, wherein Si(k) represents the interference spectrum represented by the interference signal and So(k) represents the spectrum of the measuring light.

3. The optical tomography method as defined in claim 1, wherein applying the Gaussian transform comprises:
removing noise components due to division from the compensating signal prior to applying the Gaussian transform.

4. The optical tomography method as defined in claim 2, wherein applying the Gaussian transform comprises:
removing noise components due to division from the compensating signal prior to applying the Gaussian transform.

5. The optical tomography method as defined in claim 1, further comprising:
removing noise components due to division from the compensating signal after applying the Gaussian transform; and
detecting the intensities of the reflected light based on the Gaussian transformed compensating signal with the noise components removed.

6. The optical tomography method as defined in claim 2, further comprising:
removing noise components due to division from the compensating signal after applying the Gaussian transform; and
detecting the intensities of the reflected light based on the Gaussian transformed compensating signal with the noise components removed.

7. The method as defined in claim 1, further comprising:
dividing the measuring light into a plurality of wavelengths with a diffraction grating element.

8. The method as defined in claim 7, wherein measuring the spectral components comprises:
detecting the wavelengths of the divided measuring light with photosensors.

9. An optical tomography method comprising:
dividing a light emitted from a light source into wavelengths bands;
measuring spectral components of the light source based on the divided wavelengths bands;
storing the measured spectral components of the light source as a priori;
dividing light emitted from the light source into measuring light and reference light;

projecting the measuring light onto an object;

detecting interference light comprising of light reflected from the object and the reference light;

obtaining a compensating signal by removing the stored spectral components of the light source from the detected interference light;

applying a Gaussian transform to the obtained compensating signal;

determining intensities of the reflected light in a plurality of positions in a direction of depth of the object based on frequency and intensity of the Gaussian transformed compensating signal; and generating a tomographic image of the object based on the determined intensities of the reflected light in each position in the direction of depth.

10. The optical tomography method as defined in claim 9, wherein obtaining a compensating signal comprises:

obtaining the compensating signal as:

$R(k)=\{Si(k)/So(k)\}-1$, wherein $Si(k)$ represents a spectrum of the detected interference light and $So(k)$ represents a spectrum of the light source.

11. The optical tomography method as defined in claim 9, further comprising:

removing noise components, which occur due to division, from the compensating signal prior to applying the Gaussian transform.

12. The optical tomography method as defined in claim 9, further comprising:

removing noise components, which occur due to division, from the compensating signal after applying the Gaussian transform; and detecting the intensities of the reflected light based on the Gaussian transformed compensating signal with the noise components removed.

13. An optical tomography system comprising:

a light source which emits light;

light dividing means for dividing light emitted from the light source into measuring light and reference light;

detecting means for measuring spectral components of the measuring light;

storage means for storing the measured spectral components;

multiplexing means for superposing the measuring light reflected from an object and the reference light to receive an interference light;

interference light detecting means for detecting the interference light;

calculating means for generating a compensating signal by removing the stored spectral components of the measuring light from the detected interference light and applying a Gaussian transform to the generated compensating signal; and image obtaining means for determining intensities of the light reflected from the object in a plurality of positions in a direction of depth of the object based on frequency and intensity of the Gaussian transformed compensating signal and generating a tomographic image of the object based on the determined intensities of the reflected light in each position in the direction of depth.

14. The optical tomography system as defined in claim 13, further comprising:

spectral means for dividing the measuring light into a plurality of wavelengths.

15. The optical tomography system as defined in claim 14, wherein the spectral means comprises a diffraction grating element.

16. The optical tomography system as defined in claim 14, wherein the detecting means comprises photosensors which each detects one of the wavelengths of the divided measuring light.

17. The system as defined in claim 13, comprising:

a Spectral Domain OCT (SD-OCT) system in which the light source emits low coherent light and the image obtaining means performs a Fourier transform on the Gaussian transformed compensating signal, determines the intensities of the light reflected from the object in the plurality of positions in the direction of depth of the object based on frequency and intensity of the Fourier transformed compensating signal and generates a tomographic image of the object based on the determined intensities of the reflected light in each position in the direction of depth.

18. The system as defined in claim 13, comprising:

a Swept Source OCT (SS-OCT) system in which the light source emits a wavelength swept laser beam and the image obtaining means performs an interferogram in a frequency area of the Gaussian transformed compensating signal, determines the intensities of the light reflected from the object in the plurality of positions in the direction of depth of the object based on frequency and intensity of the interferogram and generates a tomographic image of the object based on the determined intensities of the reflected light in each position in the direction of depth.

\* \* \* \* \*